F. E. F. NEUMANN.
APPARATUS FOR REFINING CHOCOLATE MASSES AND THE LIKE.
APPLICATION FILED AUG. 17, 1911.
1,026,110.
Patented May 14, 1912.
2 SHEETS—SHEET 1.
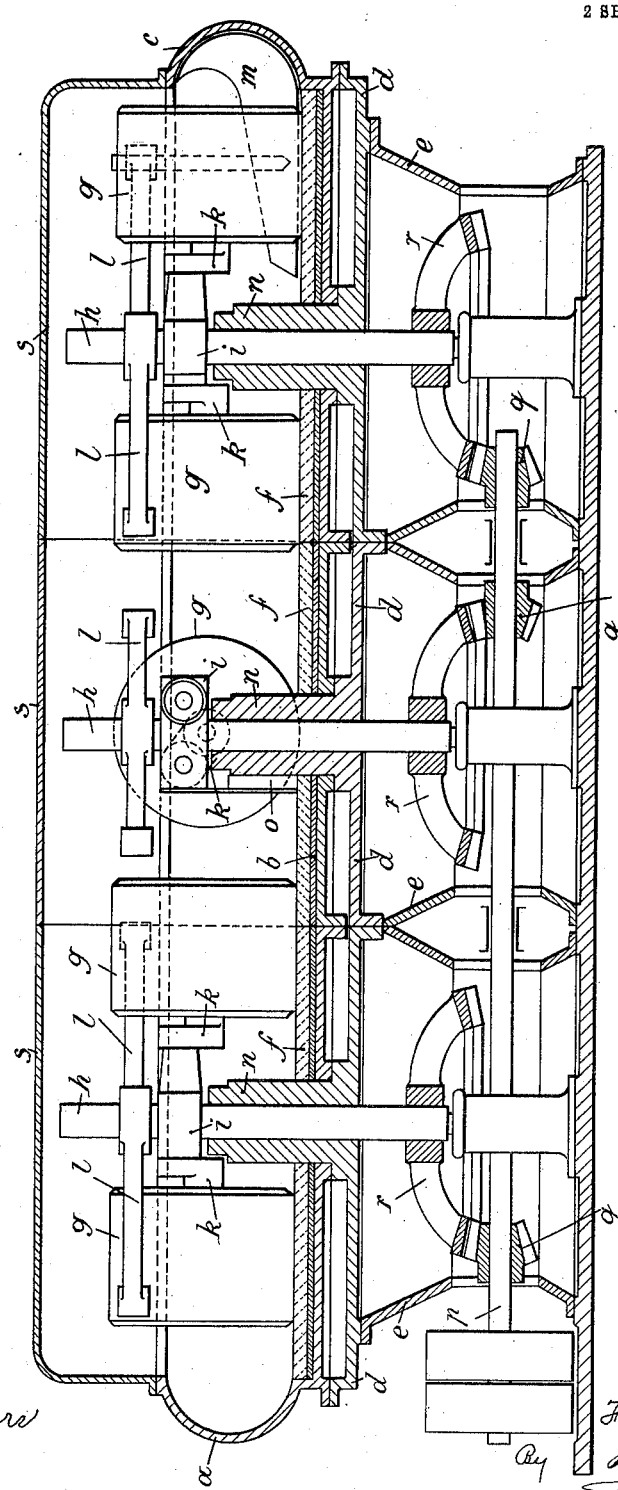

F. E. F. NEUMANN.
APPARATUS FOR REFINING CHOCOLATE MASSES AND THE LIKE.
APPLICATION FILED AUG. 17, 1911.
1,026,110.
Patented May 14, 1912.
2 SHEETS—SHEET 2.
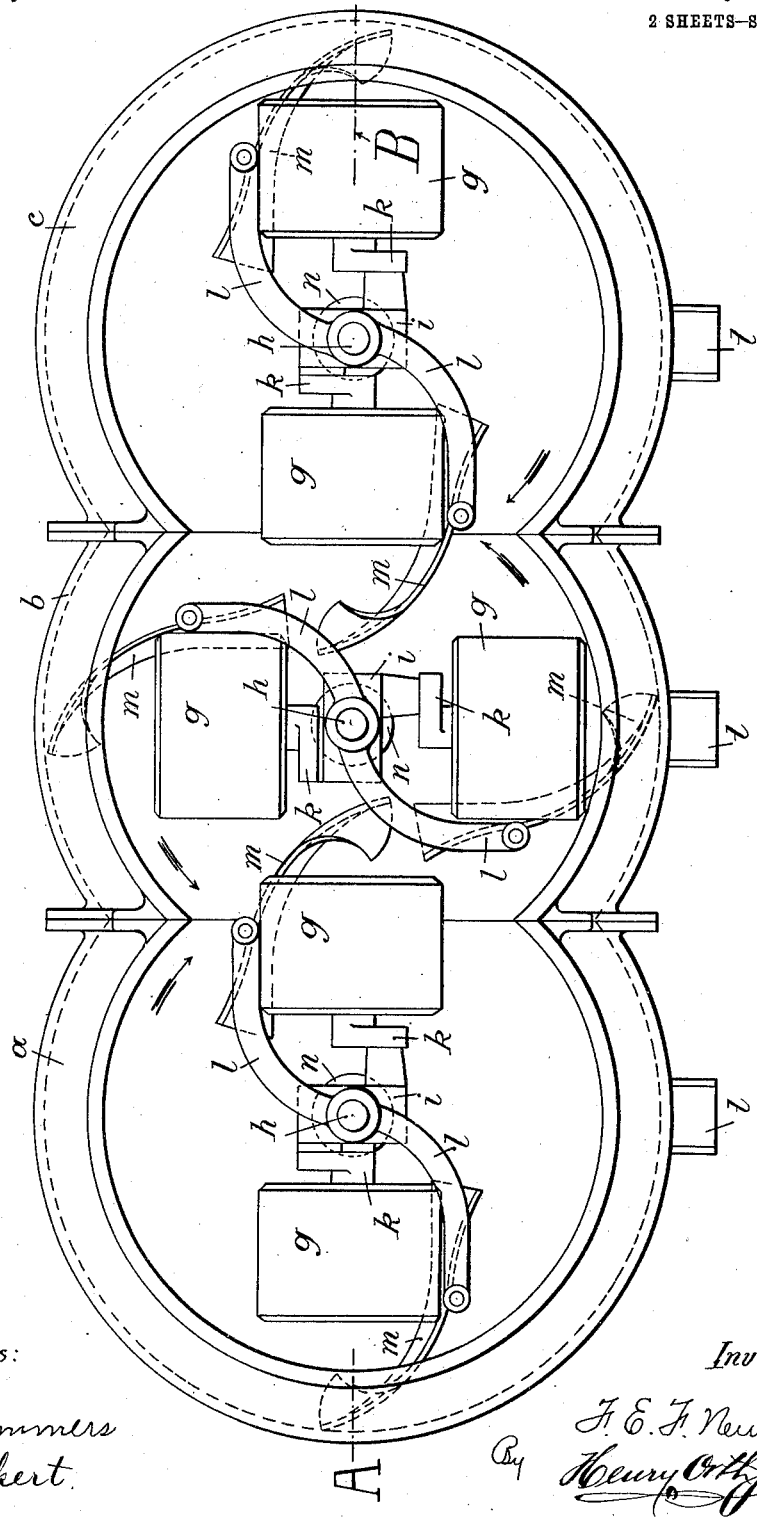
Witnesses:
B. Dommers
E. Leckert.
Inventor:
F. E. F. Neumann
By Henry Orth
Atty.

UNITED STATES PATENT OFFICE.

FRIEDRICH ERNST FERDINAND NEUMANN, OF WANDSBEK, NEAR HAMBURG, GERMANY.

APPARATUS FOR REFINING CHOCOLATE MASSES AND THE LIKE.

1,026,110.  Specification of Letters Patent.  Patented May 14, 1912.

Application filed August 17, 1911. Serial No. 644,708.

*To all whom it may concern:*

Be it known that I, FRIEDRICH ERNST FERDINAND NEUMANN, a subject of the German Emperor, and resident of Wandsbek, near Hamburg, in the German Empire, have invented certain new and useful Improvements in Apparatus for Refining Chocolate Masses and the Like, of which the following is a specification.

This invention relates to an apparatus for refining materials, more particularly gelatinous or liquid or semi-liquid substances, for example thin or viscous chocolate masses or other materials.

The invention consists in combining several simple circular roller mixing machines, in such manner that their containers open into one another and their rollers operate also within the adjacent container or containers. The mass is thus caused to undergo a continuous circulation through the whole of the containers, as the rollers in one container drive the mass at the connecting passage of two containers into the adjacent containers. By this particular movement, the continuous change of direction in the motion and more especially owing to the fact that the mass is suddenly arrested in its movement and returned by resistances such as the rollers of the adjacent containers, container walls and scrapers, a better result is obtained than in known chocolate mixing machines and the quality of the finished material is improved.

The invention is illustrated in the accompanying drawings in one embodiment of which—

Figure 1 is a central longitudinal section on the line A—B of Fig. 2, while Fig. 2 is a plan with the cover removed.

In the embodiment shown three mixers are combined to form an apparatus in accordance with this invention. It will be understood that apparatus in accordance with this invention may be formed from two or more than three mixers. As shown $a$, $b$, and $c$ are the three containers arranged adjacent one another and with their inner walls opening into one another, which containers are combined in suitable manner to form a single integer. The whole apparatus rests on a partly hollow base plate $d$ formed from several parts or sections and serving to control the temperature of the containers by passing a heating or cooling medium into or through the hollow spaces of the said base plate being carried by a lower frame $e$ also formed of several parts or sections.

The bottom faces or floors of the containers are formed of slabs $f$ of stone, or other suitable material such as iron, which slabs form the supporting and friction surfaces for the material in the containers.

The mass is worked by the rollers $g$ two of which are provided for each container. The rollers of each set are located at different radial distances from the vertical driving spindle $h$ in order to obtain a large grinding surface with comparatively narrow rollers. The distance of the spindles $h$ from one another is so arranged that the paths of the rollers of two adjacent containers partly overlap or run into one another. The rollers are connected with the spindle $h$ through the collar $i$ and cranks $k$ in such manner that they act by gravity on the mass and rise and fall suiting themselves to the height or depth of the mass. The spindle $h$ carries over the collar $i$ a transverse member $l$ in each end of which is held a scraper $m$ for each roller which scraper raises the material pressed by the roller on the bottom of the container and brings the material adhering to the walls of the container into the path of the rollers. The walls of the containers are trough shaped so that the material thrown off by the rollers is thrown back and is turned over and mixed. The form of the scrapers will depend naturally upon the form of the container wall. In order to release the material adhering to the sleeves $n$ forming neck bearings of the spindles $h$ a scraper $o$ may be secured to each of the collars $i$. Only one of such scrapers $o$ is shown in Fig. 1. Suitable scrapers (not shown in the drawing and of known form) keep the rollers clean in well known manner. The spindles $h$ are driven from a common shaft $p$ through pairs of bevel pinions $q$, $r$. The containers are closed by a cover or covers $s$ at their upper ends.

Outlets $t$ (Fig. 2) formed in the containers serve for removal of the treated mass, and for this purpose the rollers with their scrapers $m$ are rotated in opposite directions. The scrapers $m$ thus force the mass outward. The arrangement of a reversing gear necessary for this purpose is also of advantage for the whole working or operation of the apparatus since the apparatus may be temporarily rotated in the reverse direction in order to obtain a new effect that it to say, the discharge of the treated mass.

I claim:

1. An apparatus of the character described, comprising a receptacle having arcuate sides, a plurality of rotatable rolls revoluble in the receptacle in paths concentric to said sides, the path of one roll intersecting the path of an adjacent roll.

2. An apparatus of the character described, comprising a receptacle having arcuate sides, a plurality of rotatable rolls revoluble in the receptacle in paths concentric to said sides, the path of one roll intersecting the path of an adjacent roll, and scrapers movable with the rolls to remove material from the sides of the receptacle.

3. An apparatus of the character described, comprising a receptacle having grooved arcuate sides, a plurality of pairs of rotatable rolls revoluble in the receptacle in paths concentric to said sides, the paths of one pair of rollers intersecting the paths of the adjacent pair of rolls.

4. An apparatus of the character described, comprising a receptacle having grooved arcuate sides, a plurality of pairs of rotatable rolls revoluble in the receptacle in paths concentric to said sides, the paths of one pair of rollers intersecting the paths of the adjacent pair of rolls, and scrapers conforming to the contour of said walls movable with the rolls to remove material from the walls.

5. An apparatus of the character described, comprising a receptacle having grooved arcuate sides, a plurality of pairs of rotatable rolls revoluble in the receptacle in paths concentric to said sides, the paths of one pair of rollers intersecting the paths of the adjacent pair of rolls, and scrapers movable with the rolls having their free ends conforming to the contour of the sides and pointing in the direction of movement of the rolls.

6. An apparatus of the character described, comprising a receptacle having grooved arcuate sides, a plurality of pairs of rotatable rolls revoluble in the receptacle in paths concentric to said sides, the paths of one pair of rollers intersecting the paths of the adjacent pair of rolls, and means to revolve each adjacent pair of rolls and scrapers in opposite directions.

7. An apparatus of the character described, comprising a trough having arcuate, grooved end walls, pairs of rotatable rolls revoluble in said trough in paths concentric to the walls, the rollers of each pair being at different radial distances from their axis of revolution, the paths of the rollers of each pair intersecting the paths of the rollers of the adjacent pair.

8. An apparatus of the character described, comprising a trough having arcuate, grooved end walls, connected by intermediate arcuate grooved side walls, pairs of rotatable rolls revoluble in said trough in paths concentric to the walls, the rollers of said pair being at different radial distances from their axis of revolution, the paths of the rollers of each pair intersecting the paths of the rollers of the adjacent pair.

9. An apparatus of the character described, comprising a receptacle having grooved arcuate sides and discharge apertures therein, a plurality of rotatable rolls revoluble in the receptacle in paths concentric to said sides, scrapers projecting beyond the rolls having their free ends conforming to the contour of the sides of the receptacle and curved in the direction of the normal movement of the rolls, and means to reverse the movement of the rolls and scrapers, whereby the latter will force the material outward through the discharge apertures.

10. An apparatus of the character described, comprising a plurality of receptacles connected with each other and a plurality of revoluble rolls mounted therein, the path of one roll intersecting the path of the adjacent roll.

11. An apparatus of the character described, comprising a plurality of receptacles, connected with each other and a plurality of revoluble rolls mounted therein, the path of one roll intersecting the path of the adjacent roll, and scrapers movable with the rolls adapted to receive material from the sides of the receptacles.

12. An apparatus of the character described, comprising a plurality of receptacles connected with each other and a plurality of revoluble rolls mounted therein, the path of one roll intersecting the path of the adjacent roll, and scrapers movable with the rolls having their free ends conforming to the contour of the sides of said receptacles and pointing in the direction of movement of the rolls.

13. An apparatus of the character described, comprising a plurality of receptacles connected with each other and a plurality of pairs of rotatable rolls revoluble in the receptacles, the paths of one pair of rolls intersecting the paths of the adjacent pair of rolls.

14. An apparatus of the character described, comprising a plurality of receptacles, connected with each other and a plurality of pairs of rotatable rolls revoluble in the receptacles, the paths of one pair of rolls intersecting the paths of the adjacent pair of rolls, and scrapers movable with the rolls and adapted to receive material from the sides of the receptacles.

15. An apparatus of the character described, comprising a plurality of receptacles connected with each other and a plurality of pairs of revoluble rolls revoluble in the receptacles, the path of one pair of rolls intersecting the paths of the adjacent pair of rolls, and means to revolve each adjacent pair of rolls and scrapers in opposite directions.

16. An apparatus of the character described, comprising a plurality of receptacles connected with each other, pairs of rotatable rolls revoluble in said receptacles, the rollers of each pair being at different radial distances from their axis of revolution, the paths of the rollers of each pair intersecting the paths of the rollers of the adjacent pair.

17. An apparatus of the character described, comprising a plurality of receptacles, connected with each other and having discharge apertures, a plurality of rotatable rolls revoluble in the receptacles, scrapers projecting beyond the rolls having their free ends conforming to the contour of the sides of the receptacles and curved in the direction of the normal movement of the rolls, and means to reverse the movement of the rolls and scrapers, whereby the latter will force the material outward through the discharge apertures.

18. An apparatus of the character described, comprising a plurality of receptacles connected with each other and having arcuate sides, and a plurality of rotatable rolls revoluble in the receptacles in paths concentric to said sides, the path of one roll intersecting the path of an adjacent roll.

19. An apparatus of the character described, comprising a plurality of receptacles connected with each other and having arcuate sides, a plurality of rotatable rolls revoluble in the receptacles in paths concentric to said sides, the path of one roll intersecting the path of an adjacent roll, and scrapers movable with the rolls having their free ends conforming to the contour of the sides of said receptacles.

20. An apparatus of the character described, comprising a plurality of receptacles connected with each other and having arcuate, grooved end walls, connected by intermediate arcuate grooved side walls, rolls revoluble in said receptacles in paths concentric to their walls, the paths of each roller intersecting the paths of the adjacent roller.

FRIEDRICH ERNST FERDINAND NEUMANN.

Witnesses:
MAX A. G. LEMCKE,
ERNEST H. L. MUMMENHOFF.

---

Copies of this patent may be obtained for five cents each, by addressing the "Commissioner of Patents, Washington, D. C."